(12) United States Patent
Bilodi

(10) Patent No.: US 8,195,956 B2
(45) Date of Patent: Jun. 5, 2012

(54) RE-KEYING DATA IN PLACE

(75) Inventor: Prakash B. Bilodi, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 381 days.

(21) Appl. No.: 12/542,438

(22) Filed: Aug. 17, 2009

(65) Prior Publication Data

US 2011/0038477 A1  Feb. 17, 2011

(51) Int. Cl.
*H04L 9/00* (2006.01)
(52) U.S. Cl. ........... 713/189; 713/193; 380/277; 726/26
(58) Field of Classification Search .................. None
See application file for complete search history.

(56) References Cited

U.S. PATENT DOCUMENTS

| | | | |
|---|---|---|---|
| 5,623,669 A | 4/1997 | Kincaid | |
| 5,915,025 A * | 6/1999 | Taguchi et al. | 380/44 |
| 5,940,508 A | 8/1999 | Long et al. | |
| 7,110,546 B2 * | 9/2006 | Staring | 380/260 |
| 7,165,158 B1 | 1/2007 | Yagawa | |
| 7,490,248 B1 * | 2/2009 | Valfridsson et al. | 713/193 |
| 7,546,482 B2 | 6/2009 | Blumenau et al. | |
| 7,559,088 B2 | 7/2009 | Cohen et al. | |
| 8,010,809 B1 * | 8/2011 | Shah | 713/193 |
| 2002/0126849 A1 * | 9/2002 | Howard et al. | 380/277 |
| 2002/0138747 A1 * | 9/2002 | Clarke | 713/189 |
| 2004/0153616 A1 | 8/2004 | Nakamura et al. | |
| 2005/0033828 A1 | 2/2005 | Watanabe | |
| 2007/0058801 A1 | 3/2007 | Plotkin et al. | |
| 2007/0094466 A1 | 4/2007 | Sharma et al. | |
| 2007/0130432 A1 | 6/2007 | Aigo | |
| 2007/0174634 A1 * | 7/2007 | Plotkin et al. | 713/189 |
| 2007/0220312 A1 | 9/2007 | Boyd et al. | |
| 2007/0245104 A1 | 10/2007 | Lindemann et al. | |
| 2008/0229118 A1 | 9/2008 | Kasako et al. | |
| 2008/0240434 A1 | 10/2008 | Kitamura | |
| 2008/0319909 A1 * | 12/2008 | Perkins et al. | 705/50 |
| 2009/0041249 A1 * | 2/2009 | Tanaka et al. | 380/277 |

OTHER PUBLICATIONS

Office Action Dated Dec. 7, 2011 for U.S. Appl. No. 12/615,408.
Office Action Dated May 3, 2011 for U.S. Appl. No. 12/183,581.
Amendment and Response to Office Action Dated May 3, 2011 for U.S. Appl. No. 12/183,581.
Office Action Dated Oct. 18, 2011 for U.S. Appl. No. 12/183,581.
Amendment and Response to Office Action Dated Oct. 18, 2011 for U.S. Appl. No. 12/183,581.
Final Office Action Dated Mar. 7, 2012 for U.S. Appl. No. 12/183,581.

* cited by examiner

*Primary Examiner* — Ponnoreay Pich
(74) *Attorney, Agent, or Firm* — Conley Rose, P.C.

(57) ABSTRACT

A system comprises an encryption engine and a host processor coupled to the encryption engine. The host processor determines when a time period has expired for a unit of data. Upon determining that the time period has expired, the host processor causes the encryption engine to re-key the unit of data in place.

23 Claims, 3 Drawing Sheets

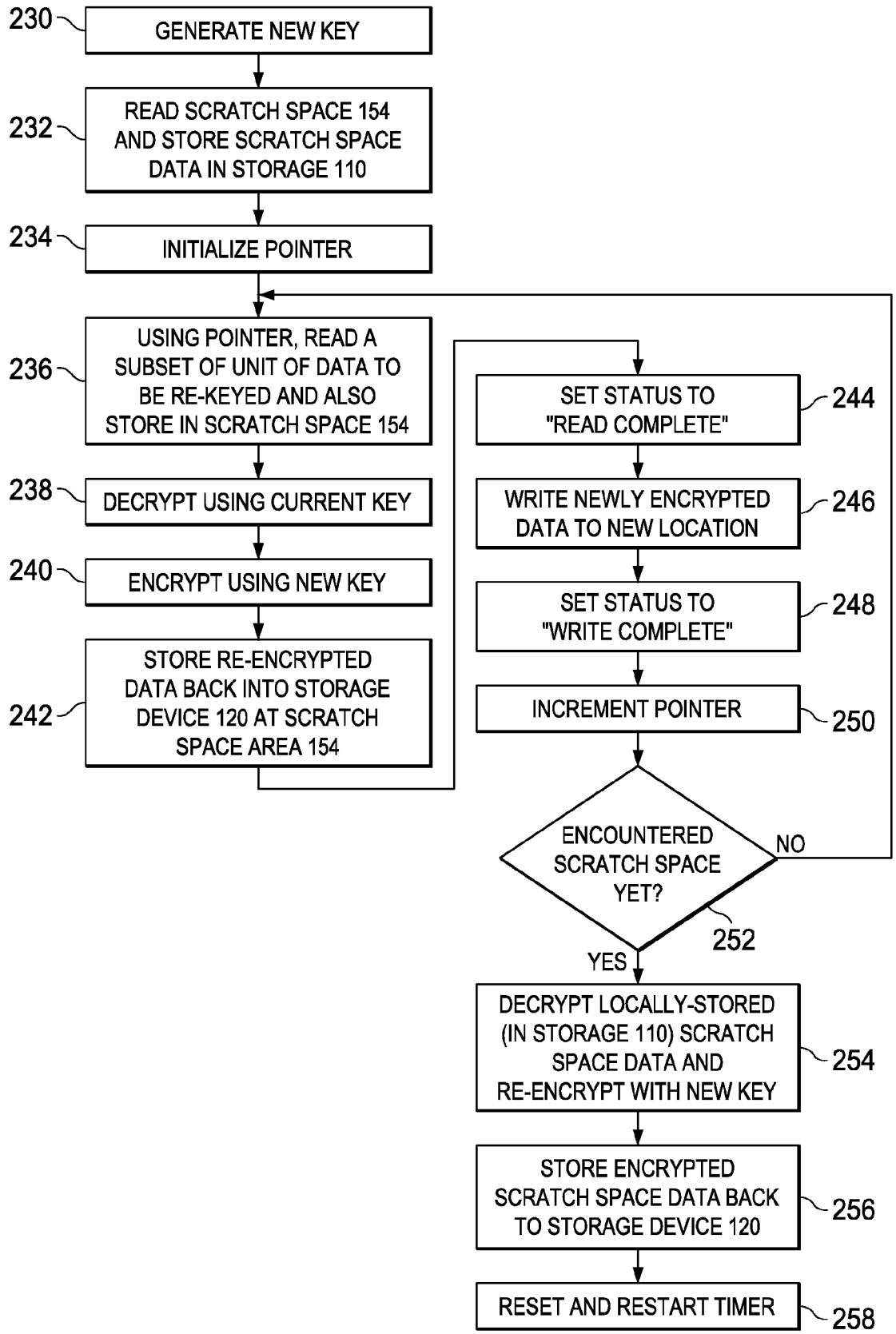

RE-KEYING DATA IN PLACE

BACKGROUND

1. Field of the Subject Matter

The subject matter disclosed herein relates to networks, and more particularly to re-keying in place of data stored on storage units.

2. Background Information

In some storage systems, data is stored in encrypted form in a storage device. Data encryption typically involves the use of a key to encrypt and decrypt the data. Loss of the key, for example, to theft unfortunately can compromise the security of the data.

SUMMARY

Various embodiments are described herein in which a unit of data from a storage device is automatically re-keyed in place. In accordance with the preferred embodiments, a time period is associated with each unit of data. Upon expiration of the time period, a processor causes the unit of data to be re-keyed in place. The re-keying process comprises, for example, the generation of a new key, decryption of the unit of data using the current key, encrypting the decrypted data using the newly generated key, and storing the re-encrypted data back in the storage device thereby overwriting the original data.

In accordance with at least one embodiment, a system comprises an encryption engine and a host processor coupled to the encryption engine. The host processor determines when a time period has expired for a unit of data. Upon determining that the time period has expired, the host processor causes the encryption engine to re-key the unit of data in place.

In accordance with another embodiment, a method comprises determining, by a processor, when a time period associated with a unit of data has expired. Upon determining that the time period as expired, the method further comprises the processor initiating re-keying in place the unit of data.

In accordance with yet another embodiment, a computer-readable storage medium contains software that, when executed by one or more processors, causes the one or more processors to determine when a time period associated with a unit of data has expired and, upon determining that the time period as expired, to initiate re-keying in place of the unit of data.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the accompanying drawings and detailed description, wherein like reference numerals represent like parts:

FIG. 6 shows an alternative embodiment of a method for re-keying data upon expiration of a timer.

NOTATION AND NOMENCLATURE

Certain terms are used throughout the following claims and discussion to refer to particular components. This document does not intend to distinguish between components that differ in name but not function. In the following discussion and in the claims, the terms "including" and "comprising" are used in an open-ended fashion, and thus should be interpreted to mean "including but not limited to." Also, the term "couple" or "couples" is intended to mean either an indirect or direct electrical connection, optical connection, etc. Thus, if a first device couples to a second device, that connection may be through a direct electrical connection, or through an indirect electrical connection via other devices and connections. Additionally, the term "system" refers to a collection of two or more hardware components.

The term "system" means one or more components coupled together. A system thus may refer to a collection of, for example, two or more computers or storage devices. A system may also refer to two or more components of, for example, a computer or storage device.

The term "key" refers to an encryption or decryption key used in an encryption or decryption process.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figure 1:
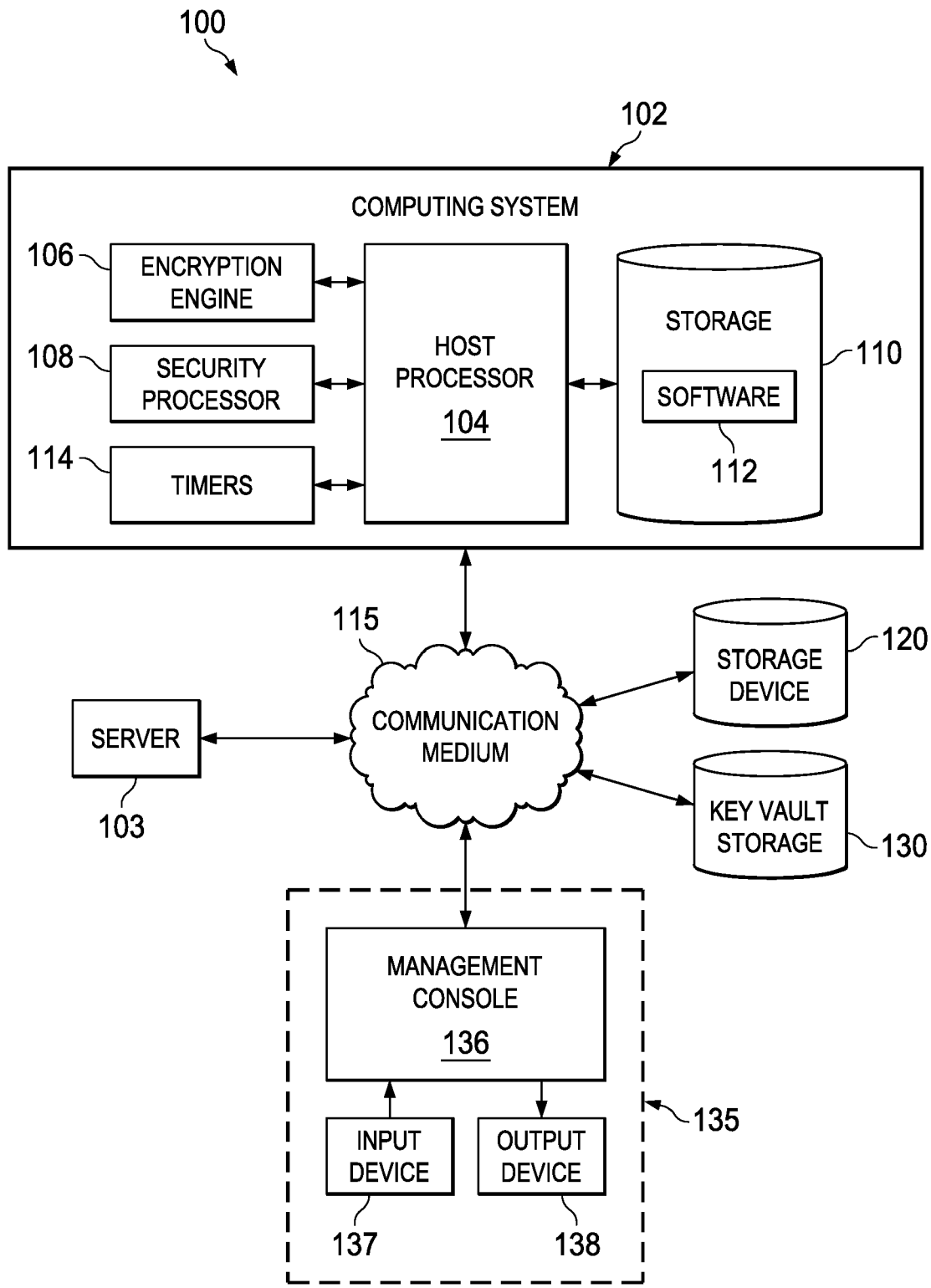
FIG. 1 illustrates a system in accordance with at least some embodiments.

FIG. 1 illustrates a system 100 comprising a computing system 102 coupled via a communication medium 115 to a storage device 120, to a key vault storage 130, and to a sever 103. The communication medium 115 can be wired or wireless and can implement any suitable type of protocol. In at least one embodiment, the Fibre Channel (FC) protocol can be implemented to interconnect the computing system 102, storage device 120, and key vault 130. The communication medium 115 can comprise a single network or can comprise multiple (e.g., different) networks. For example, the communication medium 115 may comprise a local area network (LAN) used for management communications between the management console 136, the keyvault storage 130, and the computing system 102, as well as a storage area network (SAN) used for data communications between the server 103, the storage device 120 and the computing system 102.

The storage device 120 preferably comprises non-volatile storage such as a hard disk drive. Multiple such storage devices 120 may be included as well and coupled to the computing system 102 via the communication medium 115. Devices such as server 103 write data to and read data from storage device 120.

The computing system 102 may comprise a server or other type of computer and can perform one or more functions. At least one function performed by the computing system 102 includes re-keying in-place of data stored on the storage device 120. Re-keying in place means that encrypted data stored on storage device 120 is decrypted using the current encryption key used to encrypt such data in the first place, re-encrypted with a new key and stored back in the same location (e.g., same address) as the originally encrypted data. The originally encrypted data is overwritten with the re-encrypted data. Re-keying in place increases the security of the data from theft or other type of loss of the key.

Rekeying in-place typically has been a manual process which is time-consuming and cumbersome. In accordance with various embodiments of the invention, re-keying of data is performed automatically, that is, without requiring a human to initiate and/or perform the re-keying process. In accordance with at least some embodiments, a time period is associated with each unit of data. Expiration of the time period causes a processor to re-key the data associated with the expired time period. The re-keying process repeats. Each time the time period expires and the data is re-keyed, the encrypted data is decrypted using the current key, and a new key is generated and used to re-encrypt the data. The new key preferably is different from the current key (also referred to as "old key"). Preferably, each time the data is re-keyed, a different key is generated and used in the re-keying process.

Reference is made herein to a "unit of data" being re-keyed. In accordance with various embodiments, each unit of data may comprise a logical unit number (LUN) identifier. As used herein, the term "LUN" may refer to the identifier of the logical unit, or the logical unit itself. In general, a unit of data comprises a block of data accessible to be read or written.

Referring still to FIG. 1, computing system 102 comprises a host processor 104 coupled to an encryption engine 106, a security processor 108, and storage 110. The encryption engine 106 encrypts data and decrypts encrypted data. The host processor 104 provides, or causes to provide, a key to the encryption engine 106 for use in encryption and decryption operations. In some embodiments, the host processor 104 comprises a single processor core, but in other embodiments, the host processor 104 may be implemented as multiple processors or multiple processor cores.

The security processor 108 generates a new key upon receipt of a command from the host processor 104 to generate a new key. The security processor 108 generates the new key in accordance with any of a variety of techniques. At least some such techniques include the use of a random number generator. The host processor 104 requests a new key from the security processor 108, and provides the newly generated key to the encryption key 106 for use in encrypting or decrypting data stored on the storage device 120. The newly generated key can be stored in the key vault storage 130. Key vault storage 130 may be separate from the computing system 102 and accessible via communication medium 115. Alternatively, the key vault storage 130 may be included as part of the computing system 102. In accordance with at least some embodiments, the key vault 130 stores the newly generated key as well as some or all previous keys used for a given unit of data. The key vault 130 thus provides an audit trail as to which keys have been used for each unit of re-keyed data.

Storage 110 comprises a computer-readable storage medium and, as such, may comprise non-volatile storage (e.g., Flash memory, read-only memory, hard disk drive, etc.), volatile storage (e.g., random access memory), or combinations thereof. Storage 110 comprises software 112 that is executable by the host processor 104 (which may be implemented as one or more processors) and/or security processor 108 to provide the host processor 104 and/or security processor 108 with the functionality described herein. In some embodiments, the storage 110 comprises multiple storage devices, at least one of which comprises non-volatile storage provided within the host processor itself. In such embodiments, the host processor 104 has its own storage for storing the software that it executes. Similarly, the security processor 108 may also contain its own storage containing the software executed by the security processor 108.

Figure 2:
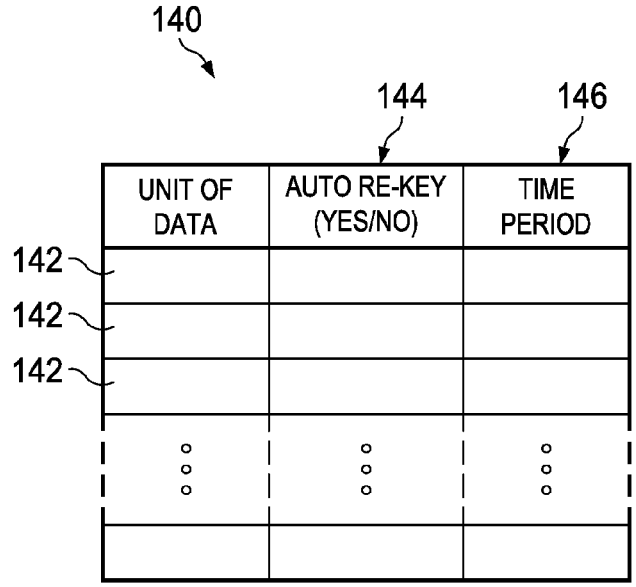
FIG. 2 illustrates a graphical user interface for configuring individual units of data for automatic re-keying in place in accordance with at least some embodiments.

Each unit of data on the storage device 120 is configurable to be automatically re-keyed. FIG. 2 illustrates a graphical user interface (GUI) 140 by which a user can select whether or not a given unit of data (142) is to be automatically re-keyed (144). The GUI of FIG. 2 is implemented, for example, on a management workstation 135 (FIG. 1) which can access the computing system 102 via the communication medium. The management workstation 135 comprises a management processing logic 136 (e.g., processor, memory, etc.), an input device 137 (e.g., keyboard, mouse, etc.), and an output device 138 (e.g., display). Via the management workstation 135, a user also can select or otherwise specify the time period (146) for each such unit of data, the expiration of which causes the data to be automatically re-keyed. For example, the user can select 1 minute, 10 minute, 1 hour intervals, 1 day, etc. intervals. The data will automatically be re-keyed at each such interval. If, for example, the 1 day time period is selected, the corresponding data will be re-keyed once per day. Each time the data is re-keyed, a timer is reset to begin counting to the expiration of the next time period. Different time periods can be selected and programmed for different units of data. For example, one unit of data can be configured for re-keying once per day, while another unit of data is configured for re-keying once per hour.

Upon the expiration of a time period associated with a particular unit of data, the host processor 104 requests a new key from the security processor 108. The security processor 108 responds to the request by generating the key, and provides the newly generated key to the host processor 104. The host processor 104 provides, or otherwise causes to provide, the newly generated key to the encryption engine 106. The encryption engine retrieves the unit of data, for which the time period has expired, from storage 120, decrypts the unit of data using the current key for that unit of data (i.e., the key used to encrypt the unit of data in the first place), encrypts the decrypted data using the newly generated key, and stores the re-encrypted data back in the same location on the storage device 120, thereby completing the re-keying process. Upon storing the re-encrypted data on the storage device 120, the host processor 104 awaits the next expiration of the time period, at which time the host processor 104 repeats the re-keying process.

In accordance with various embodiments, the computing system 102 comprises one or more timers 114. In some embodiments, the timers 114 are implemented in software 112. In other embodiments, the timers 114 comprise hardware timers. Each timer 114 can be programmed by the host processor 104 to be associated with a given unit of data. Further, each timer 114 can be programmed for a specific time period (1 hour, 1 day, etc.). The host processor 104 programs a timer for a specific time period and associates that timer with a given unit of data. For example, in the embodiment in which each timer is implemented in software, the association between the timer and a particular unit of data is provided as an identifier of the unit of data passed to a "start timer" function as an input argument. The host processor 104 starts the timer 114. At the expiration of the programmed time period, the timer 114 transmits a signal (e.g., an interrupt signal) to the host processor 104. The host processor 104 responds to the timer's signal by re-keying the unit of data corresponding to that particular timer 114. Upon re-keying the data, the host processor 104 resets the timer 114 and causes the timer to begin counting again.

Figure 3:
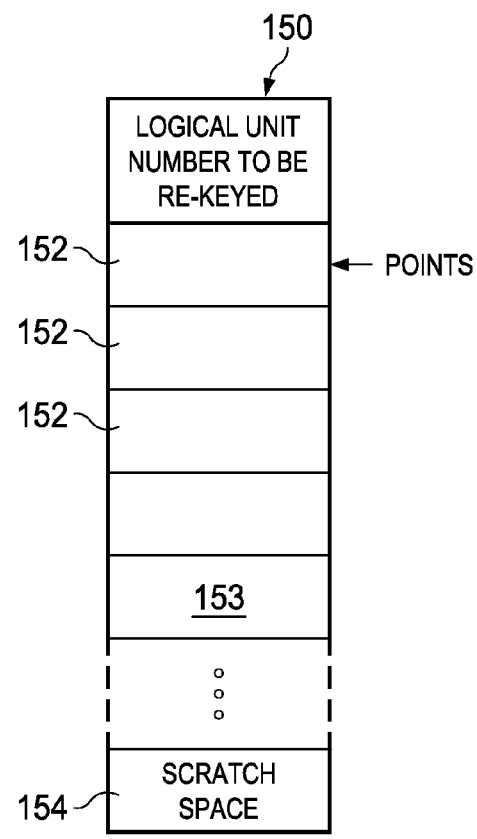
FIG. 3 illustrates unit of data in accordance with various embodiments.

FIG. 3 depicts an illustrative unit of data 150. In accordance with various embodiments of the invention, the re-keying process re-keys subsets of the unit of data 150. For example, unit of data 150 comprises multiple subsets of data 152. In accordance with one example, each subset 152 comprises 256 kbytes of data, and the size of the logical unit 150 may comprise, for example, 2 terabytes, although larger or smaller logical unit sizes are possible as well. The last subset of data is referred to as the scratch space 154 of data and its use will be explained above.

Figure 4:
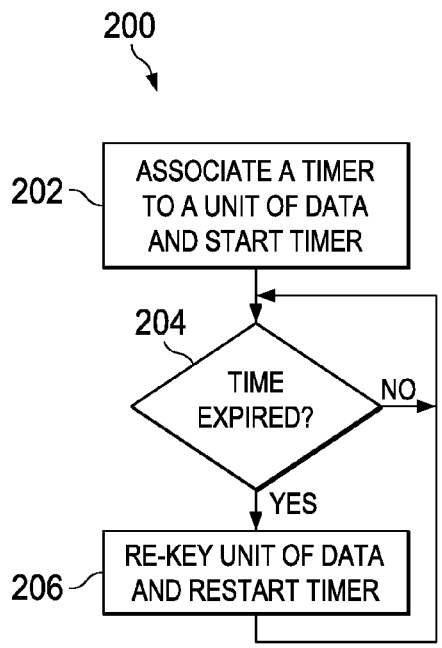
FIG. 4 shows a method in accordance with various embodiments.

FIG. 4 illustrates a method 200 in accordance with various embodiments. The actions depicted in FIG. 4 can be performed, or coordinated, by host processor 104. At 202, a timer is associated with a given unit of data. When the timer expires (determined at 204), the unit of data is re-keyed at 206. At 208, the host processor restarts the timer and control loops back to 204 to detect or otherwise determine when the timer again expires, at which time the data is again re-keyed.

Figure 5:
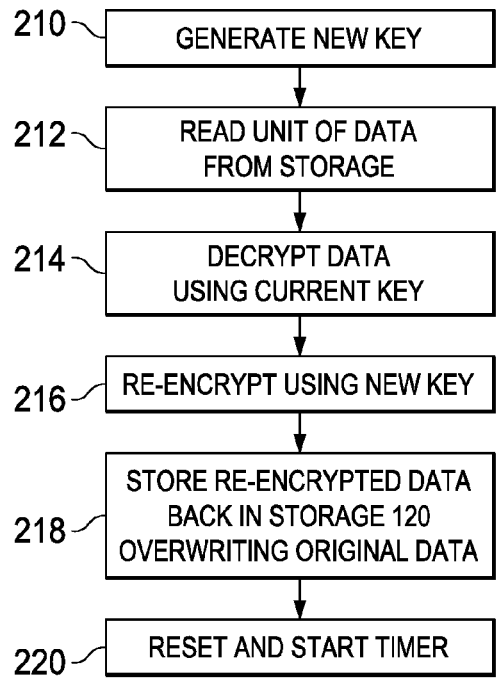
FIG. 5 shows an embodiment of a method for re-keying data upon expiration of a timer.

FIG. 5 illustrates one embodiment of implementing the re-key process of 206. At 210, the host processor 104 requests the security processor 108 to generate a new key and the security processor 108 generates the requested key. At 212, the unit of data associated with the expired timer is read from storage 120. At 214, the encryption engine 106 decrypts the unit of data using the key used to previously encrypt the unit of data. The current key is obtained from the host processor 1024 or is already stored in the encryption engine 106. At 216, the now decrypted data is encrypted by the encryption engine 106 with the newly generated key. At 218, the host processor 104 stores the re-encrypted data back into the storage device 120 thereby overwriting the original data (i.e., the encrypted data that was read and decrypted at 212 and 214, respectively). At 220, the host processor 104 resets and restarts the timer associated with the re-keyed unit of data. The process of FIG. 5 will repeat when the timer again expires.

FIG. 6 illustrates another embodiment of implementing the re-key process of 208 (FIG. 4). The process of FIG. 6 helps to protect the data in the event of a failure of the system during the re-key process. For example, if the system were to fail while writing newly re-encrypted data back to the storage unit, upon the system turning back on, the system would not necessarily know whether the write of the newly encrypted data back to the storage unit had completed. Further, as the original data may have been partially overwritten with re-keyed data, the original data will have been corrupted precluding a successful recovery of the re-keying process. The embodiment of FIG. 6 implements a technique to assist the system in successfully recovering from a re-key process interrupted by a system failure.

At 230, the host processor 104 requests the security processor 108 to generate a new key and the security processor 108 generates the requested key. At 232, the scratch space 154 (FIG. 3) is read and the data contained therein is stored in local storage 110 (preferably non-volatile storage). At 234, a pointer associated with the timer is initialized to point to the beginning of the unit of data being re-keyed (see FIG. 3).

At 236, the host processor 104 reads a subset of the unit of data 150 to be re-keyed. The particular subset read is the subset pointed to by pointer. The host processor 104 also causes a copy of the newly read data subset to be stored in the scratch space 154 on the storage device 120. As will be explained below, the copy of the original data subset stored in the scratch space 154 can be used to recover a re-keying process that is interrupted by a system failure when re-keying data at the corresponding subset location in the unit of data 150. At 238, the encryption engine 106 decrypts the subset using the current key (i.e., the key used to encrypt the subset), and at 240, the encryption engine encrypts the decrypted data using the new key. At 242-246, the host processor 104 stores the newly encrypted data into the scratch space 154 of the unit of data (242), sets a status flag (preferably in non-volatile storage of storage 110) associated with the unit of data or the particular subset just encrypted to "read complete" to indicate that the data has been successfully stored in the scratch space 154 (244), and then writes the encrypted data to the original location in the unit of data 150 thereby overwriting the original data (246). The status flag also species the subset 152 of the unit of data to which the status pertains.

At 248, the host processor 105 changes the status flag to "write complete" thereby indicating that the subset of data has been successfully re-keyed. The host processor 105 increments the pointer at 250 to point to the next subset of data. If the pointer does not yet point to the scratch space 154 (decision 252), then control returns to 236 and the rekeying process repeats for the next unit of data. If, however, upon being incremented, the pointer now points to the scratch space 154, then at 254 the host processor 104 decrypts the copy of the data from the scratch space 154 stored in storage 110 using the current key and encrypts the data using the new key. The host processor 104 stores the newly encrypted scratch space data back in the scratch space 154 in storage 120 (256). At 258, the host processor 104 resets and restarts the timer associated with the newly re-keyed unit of data.

Storing the original data in the scratch space 154 at action 236 helps to avoid data corruption issues that might occur if the re-keying process fails before completion. For example, if the original data read at 236 corresponds to subset 153 (FIG. 3) in the unit of data 150, the original data at subset 153 is stored in the scratch space 154. It is possible that the computing system 102 may experience a failure while writing the re-keyed data back to subset 153. If such a failure should occur, the data in subset 153 may comprise partially original data and partially re-keyed data. Upon a subsequent re-start of the computing system 102, the host processor 104 checks the status flag to determine at which subset 152 the data was being re-keyed when the failure occurred. In this example, the host processor 104 will know that the failure occurred at subset 153 within the unit of data. Further, the host processor 104 will examine the status flag to determine whether the flag is set at a "read complete" or a "write complete" status. If the flag is set to the read complete state, the host processor 104 knows that the re-keyed data was not completely written to the original location (subset 153 in this example), and the host processor will re-start the re-keying process by using the data from the scratch space area 154. However, if the flag is set at the write complete state, then the host processor 104 knows that the re-keyed data had been completely written to subset 153 within the unit of data before the failure occurred. At this point, the host processor 104 will continue the re-keying process with the data subset that follow subset 153.

The above disclosure is meant to be illustrative of the principles and various embodiment of the present invention. Numerous variations and modifications will become apparent to those skilled in the art once the above disclosure is fully appreciated. For example, while computing system 102 is shown as separate logic in FIG. 1, in other embodiments, the elements of computing system 102 may be contained within storage device 120, server 103, or other network devices. It is intended that the following claims be interpreted to embrace all such variations and modifications.

What is claimed is:

1. A system, comprising:

an encryption engine; and a host processor coupled to said encryption engine, wherein said host processor determines when a time period has expired for a unit of data, and upon determining that said time period has expired, said host processor causes said encryption engine to re-key said unit of data in place by:

a scratch space portion of the unit of data from a storage unit to memory;

causing at least a second portion of the unit of data to be read from the storage unit and stored to the scratch space portion;

setting a status flag to a read complete state to indicate that the second portion has been read;

rekeyinq the scratch space portion to produce re-encrypted data;

storing the re-encrypted data on the storage unit thereby overwriting the second portion of the unit of data; and changing the status flag to a write complete state to indicate that the re-encrypted data has been stored back in the storage unit.

2. The system of claim 1 further comprising a second processor coupled to said host processor and, upon request by said host processor, said second processor generates an encryption key for use in re-keying said unit of data.

3. The system of claim 1 wherein said unit of data is encrypted with a current encryption key, and wherein said expiration of said time period causes said host processor to cause a new encryption key to be generated for said unit of data, and said host processor causes the unit of data to be decrypted using the current encryption key and causes the unit of data to be re-encrypted using the new encryption key.

4. The system of claim 1 wherein for each of a plurality of units of encrypted data, each unit of encrypted data has an associated a time expiration value, and wherein said time expiration value being configurable separately for each of the units of encrypted data, and wherein the host processor causes each unit of encrypted data to be re-keyed upon expiration of the associate time expiration value.

5. The system of claim 1 wherein the unit of data comprises a logical unit number (LUN).

6. The system of claim 1 wherein the host processor causes said encryption engine to re-key said unit of data also by, upon rekeying all of the unit of data except for the scratch space portion:

decrypting and then re-encrypting the data of the scratch space portion previously saved to memory to produce encrypted scratch space data; and storing the encrypted scratch space data in the scratch space portion of the unit of data from the storage unit.

7. A method, comprising determining, by a processor, when a time period associated with a unit of data has expired; and upon determining that said time period as expired, said processor causing said unit of data to be re-keyed in place by:

saving a scratch space portion of the unit of data from a storage unit to memory;

causing at least a second portion of the unit of data to be read from the storage unit and stored to the scratch space portion;

setting a status flag to a read complete state to indicate that the second portion has been read;

causing the scratch space portion to be decrypted with a first key to produce decrypted data and then encrypted with a second key to produce re-encrypted data;

storing the re-encrypted data on the storage unit thereby overwriting the second portion of the unit of data; and changing the status flag to a write complete state to indicate that the re-encrypted data has been stored back in the storage unit.

8. The method of claim 7 wherein determining when the time period associated with a unit of data has expired comprises determining when a time period associated with each of a plurality of units of data has expired, wherein each unit of data has a separately programmed time period.

9. The method of claim 8 further comprising each such unit of data to be re-keyed upon determining that the time period associated with each such unit of data has expired.

10. The method of claim 7 further comprising upon determining that said time period has expired, generating a new encryption key to be used to re-key said unit of data.

11. The method of claim 7 further comprising re-keying said unit of data and resetting a timer associated with said unit of data.

12. A non-transitory computer-readable storage medium containing software that, when executed by one or more processors, causes said one or more processors to:

determine when a time period associated with a unit of data has expired; and upon determining that said time period as expired, to cause said unit of data to be re-keyed in place by:

saving a scratch space portion of the unit of data from a storage unit to memory;

causing at least a second portion of the unit of data to be read from the storage unit and stored to the scratch space portion;

setting a status flag to a read complete state to indicate that the second portion has been read;

causing the portion to be decrypted with a first key to produce decrypted data and then encrypted with a second key to produce re-encrypted data;

storing the re-encrypted data on the storage unit thereby overwriting the second portion of the unit of data; and changing the status flag to a write complete state to indicate that the re-encrypted data has been stored back in the storage unit.

13. The non-transitory computer-readable storage medium of claim 12 wherein the software causes said one or more processors to determine when the time period associated with a unit of data has expired by determining when a time period associated with each of a plurality of units of data has expired, each unit of data having a separately programmed time period.

14. The non-transitory computer-readable storage medium of claim 13 wherein the software causes said one or more processors to cause each respective unit of data to be rekeyed upon determining that the time period associated with each such unit of data has expired.

15. The non-transitory computer-readable storage medium of claim 12 wherein the software causes said one or more processors to generate a new encryption key to be used to re-key said unit of data upon determining that said time period has expired.

16. The non-transitory computer-readable storage medium of claim 12 wherein the software causes said one or more processors to re-key said unit of data by decrypting said unit of data with a first key to produce decrypted data, encrypting said decrypted data with a second key to produce re-encrypted data, and storing said re-encrypted data on a storage unit thereby overwriting said unit of data.

17. The non-transitory computer-readable storage medium of claim 12 wherein the software causes said one or more processors to reset a timer upon re-keying said unit of data.

18. The non-transitory computer-readable storage medium of claim 12 wherein the software causes the one or more processors to cause said unit of data to be re-keyed also by, upon rekeying all of the unit of data except for the scratch space portion:
   decrypting and then re-encrypting the data of the scratch space portion previously saved to memory to produce encrypted scratch space data; and
   storing the encrypted scratch space data in the scratch space portion of the unit of data from the storage unit.

19. A system, comprising:
   an encryption engine; and
   a host processor coupled to said encryption engine, wherein said host processor causes said encryption engine to re-key a unit of data in place by:
   saving a scratch space portion of the unit of data from a storage unit to memory;
   causing at least a second portion of the unit of data to be read from the storage unit and stored to the scratch space portion;
   rekeying the scratch space portion to produce re-encrypted data; and
   storing the re-encrypted data on the storage unit thereby overwriting the second portion of the unit of data.

20. The system of claim 19 further comprising a second processor coupled to said host processor and, upon request by said host processor, said second processor generates an encryption key for use in re-keying said unit of data.

21. The system of claim 19 wherein said unit of data is encrypted with a current encryption key, and wherein said host processor to cause a new encryption key to be generated for said unit of data, and said host processor causes the unit of data to be decrypted using the current encryption key and causes the unit of data to be re-encrypted using the new encryption key.

22. The system of claim 19 wherein for each of a plurality of units of encrypted data, each unit of encrypted data has an associated a time expiration value, and each such time expiration value being configurable separately for each of the units of encrypted data, and wherein the host processor causes each unit of encrypted data to be re-keyed upon expiration of an associated time expiration value.

23. The system of claim 19 wherein the unit of data comprises a logical unit number (LUN).

* * * * *